May 22, 1956 G. H. RIDINGS 2,747,015

TWO-WAY FACSIMILE SYSTEMS BETWEEN A MAIN TELEGRAPH OFFICE AND A PLURALITY OF OUT-STATIONS

Filed Aug. 11, 1950 4 Sheets-Sheet 1

INVENTOR.
G. H. RIDINGS

BY A. A. Thomas

ATTORNEY

TWO-WAY FACSIMILE SYSTEMS BETWEEN A MAIN TELEGRAPH OFFICE AND A PLURALITY OF OUT-STATIONS

Filed Aug. 11, 1950

4 Sheets-Sheet 2

INVENTOR.
G. H. RIDINGS

BY A. A. Thomas

ATTORNEY

May 22, 1956 G. H. RIDINGS 2,747,015

TWO-WAY FACSIMILE SYSTEMS BETWEEN A MAIN TELEGRAPH OFFICE AND A PLURALITY OF OUT-STATIONS

Filed Aug. 11, 1950 4 Sheets-Sheet 3

INVENTOR.
G. H. RIDINGS

BY A. A. Thomas

ATTORNEY

May 22, 1956 G. H. RIDINGS 2,747,015

TWO-WAY FACSIMILE SYSTEMS BETWEEN A MAIN TELEGRAPH OFFICE AND A PLURALITY OF OUT-STATIONS

Filed Aug. 11, 1950 4 Sheets-Sheet 4

INVENTOR.
G. H. RIDINGS

BY A. A. Thomas

ATTORNEY 2,747,015

TWO-WAY FACSIMILE SYSTEMS BETWEEN A MAIN TELEGRAPH OFFICE AND A PLURALITY OF OUT-STATIONS

Garvice H. Ridings, Summit, N. J., assignor to The Western Union Telegraph Company, New York, N. Y., a corporation of New York Application August 11, 1950, Serial No. 178,815

21 Claims. (Cl. 178—6.6)

This invention is for a facsimile telegraph system designed to promote the rapid, economical and convenient pickup and delivery of telegrams between a main telegraph office and a number of subscribers or out-stations. Any subscriber can be instantly placed in recording communication with the main office for sending a message on his facsimile transmitter, and the main office is equipped to connect with any subscriber for delivery of a received message by reproducing it in facsimile on his recorder. Every out-station or subscriber has two machines, a transmitter in which messages are deposited through a slot and facsimiled to the main office, and a recorder in which messages coming from the main office are reproduced in facsimile and deposited in a compartment for ready removal. These machines are located in places of easy access to the public, such as the lobbies of hotels, office buildings, apartment houses, and also in private business offices where a large volume of telegraph business is handled.

Generally, a single pair of wires is used to connect the two machines of each out-station with a concentrator at the main office, where a sufficient number of transmitters and recorders are installed to serve the subscribers without delay in transmitting and receiving messages. Each subscriber has his particular jack and calling signal at the concentrator, so that the main office operator knows instantly which subscriber is calling and she only has to plug in a recorder to receive the subscriber's message. Conversely, when the main office receives a message for a subscriber, the operator places the message in a transmitter and plugs it into the suscriber's jack, whereby the message is automatically facsimiled to the subscriber's recorder. If a particular out-station handles a heavy load of telegrams, each machine will be connected to the main office by a separate pair of wires, so that the two machines can operate simultaneously.

The present system is an expansion and elaboration of the facsimile telegraph system disclosed in the pending application of Ridings et al., Serial No. 33,354 filed June 16, 1948. In that prior system each subscriber had but a single small machine which operated both as a transmitter and as a recorder. Those transceivers were designed for use in private business offices and were not accessible to the public. The purpose of the present system is to serve the general public on a broad scale by installing automatic telegraph machines in public places for convenient sending and receiving of telegrams. To send a message a person merely drops the copy sheet through a slot in the transmitter (like mailing a letter) and presses a button, whereupon the message goes over the lines to the main office where it is recorded in facsimile. On the other hand, when the main office has a message to be sent to a certain out-station—say, for a person staying at a hotel which is a subscriber to this service—the operator connects a transmitter to the hotel's recorder and in a minute a facsimile of the message will be ready for delivery to the addressee.

It is an object of the invention to provide a system of the character above described in which separate transmitters and recorders are utilized at the main office and at an out-station, with provision for operatively connecting either transmitter to the distant recorder, the line wires being normally connected to the out-station recorder. The out-station transmitter has associated circuit equipment adapted to be energized for disconnecting the line wires from the out-station recorder and connecting them to the out-station transmitter, with provision for preventing the disconnection of the recorder when it is communicating with the main office and for preventing the energization of the out-station transmitter when the main office transmitter is connected to the line circuit, the energization of the main office transmitter also being prevented when the out-station recorder is communicating with the main office.

The operation and practical advantages of my improved telegraph system will be fully understood from a detailed description of the accompanying drawings in which.

Figure 1:
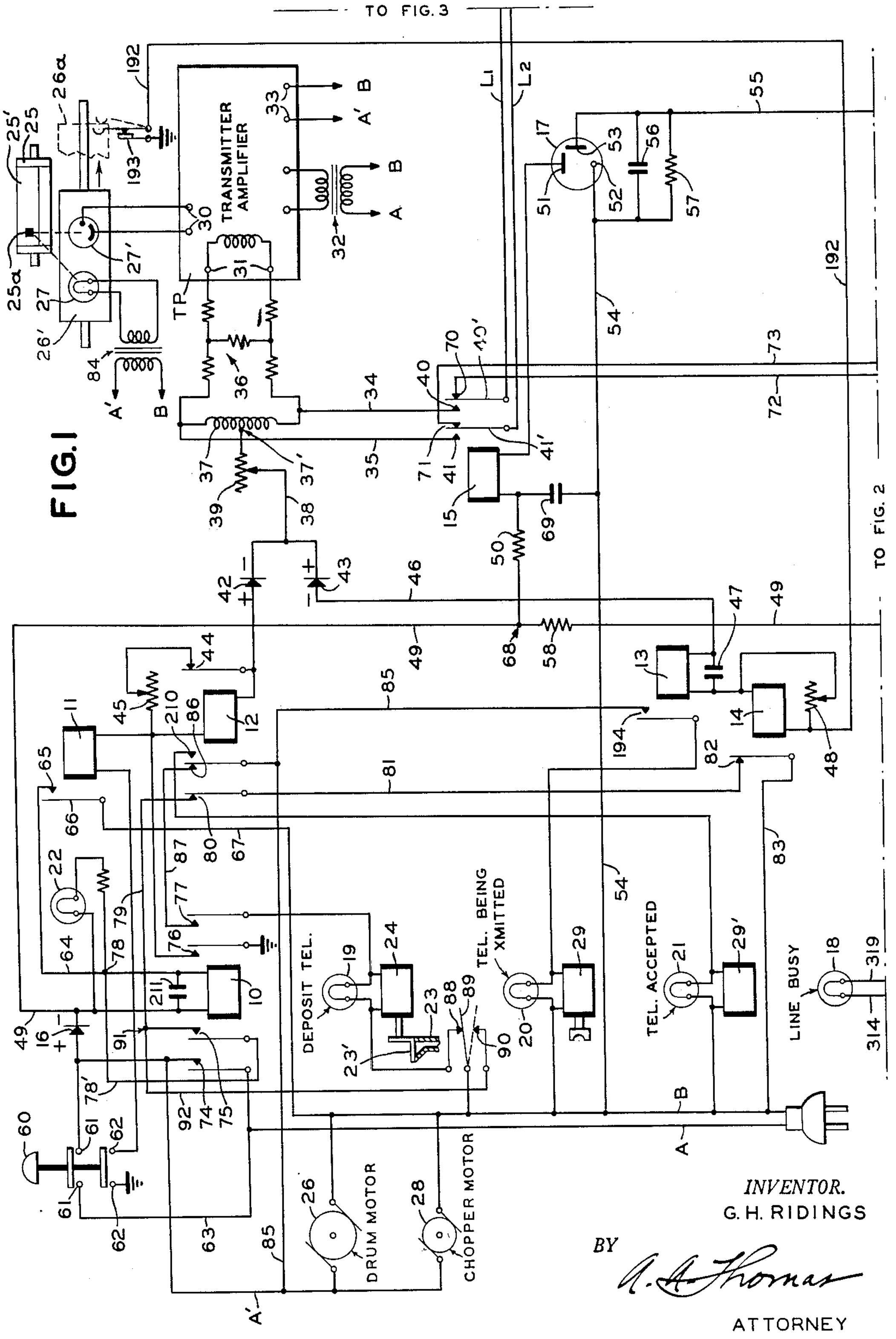
Figs. 1 and 2 show the circuits of a subscriber's transmitter and recorder, respectively.
Figures 2, 2A:
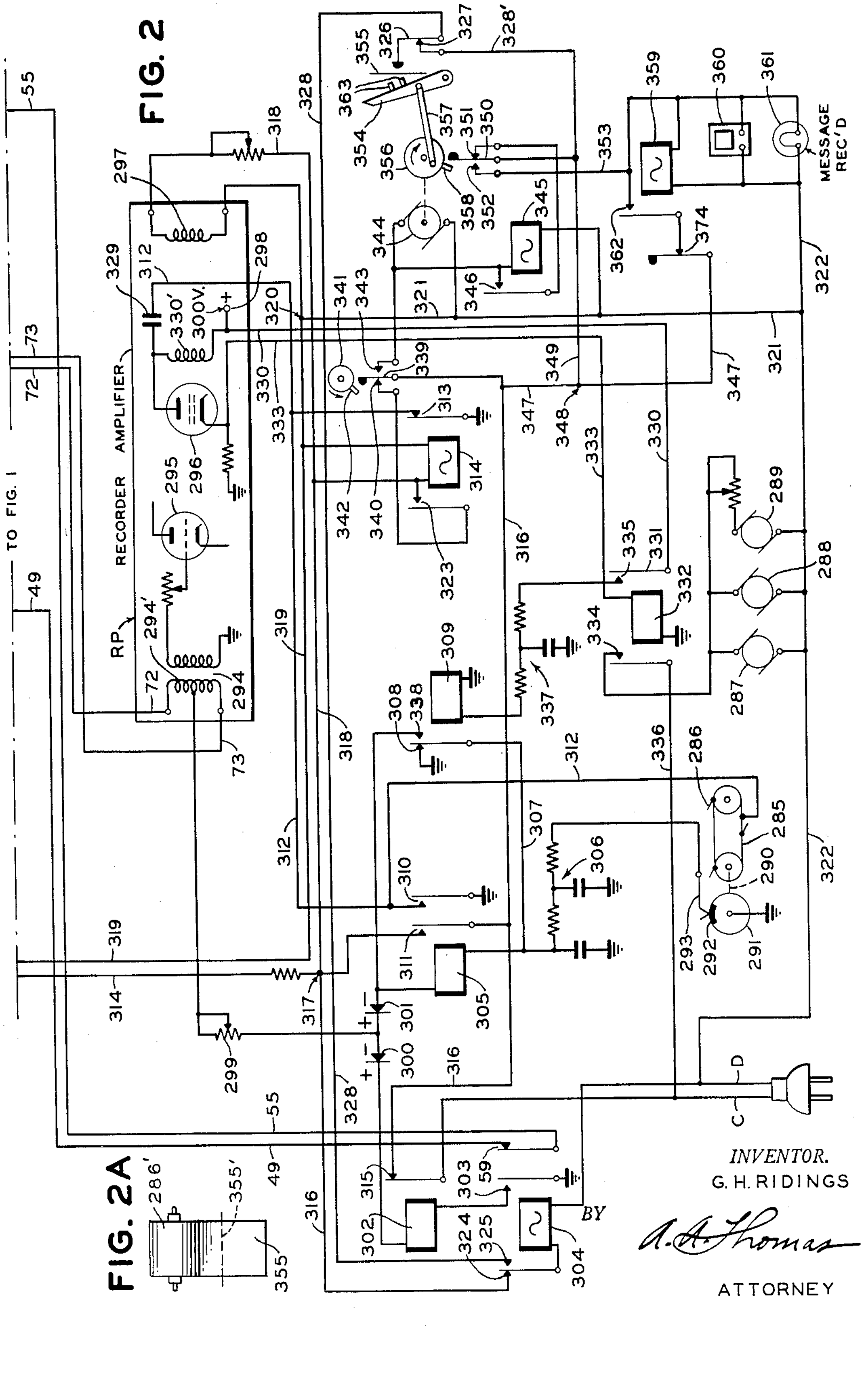
Fig. 2A is a schematic detail relating to the paper-cutting operation of the recorder in Fig. 2.

As will be seen, the four sheets of circuit drawings connect with each other to illustrate the system as applied to a single subscriber or out-station. To follow the circuit connections from one figure to the other, the drawings should be placed as follows: Fig. 2 below Fig. 1, Fig. 3 to the right of Fig. 1, and Fig. 4 below Fig. 3.

In working out the present system of facsimile communication between a main telegraph office and outlying stations, I utilized certain facsimile transmitters and recorders heretofore developed by Western Union and I have therefore included in the circuits only such structural parts of the machines used as are necessary to explain the operation of the system. The transmitter associated with the circuits of Fig. 1 is of the slot type like that disclosed in the Wise and Ridings Patent No. 2,262,715, issued November 11, 1941. The recorders at the main office (Fig. 3) and at the out-stations (Fig. 2) are of the multi-stylus page recording type like the machine disclosed in the pending application of Hallden and Zabriskie, Serial No. 83,333, filed March 25, 1949, now Patent No. 2,639,211, issued May 19, 1953. The out-station recorder of Fig. 2 has certain structural features not present in the main office recorders and forms the subject matter of an application filed December 19, 1950, by Pollard et al., Serial No. 201,608. The main-office transmitter circuits of Fig. 4 are based upon a machine like that set forth in the pending application of Hackenberg, Serial No. 122,326, filed October 19, 1949, now Patent No. 2,657,259, issued October 27, 1953.

*Subscriber's transmitter circuits (Fig. 1)*

As previously mentioned, the transmitter represented schematically in Fig. 1 is a slot type machine similar in appearance to the one shown in the Wise and Ridings Patent No. 2,262,715, and I shall briefly describe the location and arrangement of the various parts in the actual machine.

The electric power for the transmitter comes from a local commercial source represented in Fig. 1 by the two leads A and B. At the top of the machine is a panel which carries six control relays numbered 10 to 15, a half-wave selenium rectifier 16 as a source of battery potential for local control purposes, and a cold cathode tube 17. In the cover of the machine are five sign windows in a row arranged to be illuminated by white signal lamps 18 to 22. These signs read from left to right as follows: "Line busy"

(lamp 18), "Deposit telegram" (lamp 19), "Telegram being transmitted" (lamp 20) and "Telegram acceped" (lamp 21). The fifth lamp 22 shines through a red window to let the patron know that the power is on the transmitter.

At the front of the transmitter, slightly below the sign windows, is a chute 23 for the deposit of telegrams. This chute is normally closed by a cover 23' adapted to be opened by a magnet 24 when the same is energized. A deposited telegram drops down the chute and is automatically mounted on a horizontal drum 25 driven by a motor 26. The scanning of a sheet 25' on the drum is done by optical mechanism mounted on a slidable carriage 26' and including an exciter lamp 27, a photocell 27' and a chopper motor 28. The scanning carriage 26' is operated by the motor 26 upon the energizing of a magnet 29 which connects a half-nut on the carriage with a screw shaft driven by the motor. The operative connections associated with the scanning carriage 26' and the magnets 24 and 29 are fully disclosed in the Wise and Ridings patent referred to. Directly under the drum 25 is a magnet 29' which peels or strips the scanned message from the drum and deposits it in the bottom of the machine.

Since optical scanners in facsimile machines are well known, it is enough to say that the variable light beams reflected to the photocell 27' by the scanned copy on the rotating drum 25 are translated by the cell into corresponding electric signals which are impressed on the carrier wave and sent over the lines L1—L2. The scanning of marked or black areas on the message sheet produces signals of minimum voltage which are called black signals. When the white (that is, unmarked) background of the sheet is scanned, the resulting signals are of maximum voltage and are known as white or background signals. The telegram forms used for depositing in the patron's transmitter have printed thereon a black phasing mark 25a in advance of the message area, and the black signals produced by the scanning of that mark are used to control the phasing operation of the main office recorder. This will be fully explained in connection with Fig. 3.

At the rear of the transmitter in Fig. 1 is located a vacuum tube amplifier TP which receives the signals from the photocell 27' and amplifies them to the proper level for transmission over the lines L1—L2. The construction and operation of facsimile amplifiers are well understood, so I need only mention that 30 are the signal input terminals and 31 the amplified output terminals. Voltage for the filaments of the amplifier tubes is supplied by a transformer 32 which is energized at all times, but the plate terminals 33 are connected to the power leads A—B only after the power relay 10 is operated, as will be explained presently.

Conductors 34 and 35 are connected to the output terminals 31 of amplifier TP through an H-pad 36 which controls the level of the amplified facsimile signals. A transformer 37 spans the output lines 34—35 and a center tap 37' on the transformer is connected to a conductor 38 through a variable resistor 39. The lines 34—35 terminate at the normally open contacts 40 and 41, respectively, of relay 15. The associated armature contacts 40' and 41' of relay 15 are connected to the transmission pair L1—L2 of the system. The center tap conductor 38 is connected to the midway point of a pair of selenium (or like) rectifiers 42 and 43, which are arranged in series, so that only plus battery in wire 38 goes through rectifier 42 and only negative battery can pass through rectifier 43.

The positive side of rectifier 42 is connected to relays 11 and 12, with a shunt around the relay 12 through its closed contacts 44 and a variable resistor 45. The negative side of the other rectifier 43 is connected by a wire 46 to one side of relay 13, which is connected in series with relay 14 and is shunted by a capacitor 47. A variable resistor 48 is shunted around the relay 14 for a purpose that will be told in due course. The important thing to remember about the four relays 11 to 14 is that relays 11 and 12 operate only on positive battery passing through rectifier 42, while relays 13 and 14 operate only on negative battery passing through rectifier 43. For the present it is enough to say that these positive and negative potentials are impressed on lines L1—L2 at the main office and reach the transmitter in Fig. 1 at certain predetermined moments.

One side of relay 15 is connected to a conductor 49 through a resistor 50, and the other side of the relay goes to the main anode 51 of the cold cathode tube 17, which has the usual cathode 52 and a starting anode 53. The cathode 52 is directly connected to the power lead B by a wire 54, and the starting anode 53 is connected to a conductor 55. The path between the electrodes 52 and 53 is shunted by a capacitor 56 and a resistor 57, which operates with a resistor 58 in conductor 49 as a voltage divider to delay the operation of tube 17. This will be better understood from a description of the circuits that are energized when the machine is started. It should be noted that the conductors 49 and 55 pass out of Fig. 1 into the recorder diagram of Fig. 2 where they are normally closed by a pair of relay contacts 59. At this point I need only mention that the contacts 59 are closed when the patron's recorder is idle and are open when the recorder is operating.

The transmitter of Fig. 1 has a start button 60 which operates two switches 61 and 62, both of which are normally open. One terminal of switch 61 is connected by wire 63 to the main lead A, and the other terminal of that switch is connected to the plus side of rectifier 16. The negative side of this rectifier is connected to conductor 49, which goes to one side of the power relay 10. The other side of this relay goes by wire 64 to contact 65 of relay 11, and the armature contact 66 of relay 11 is connected by wire 67 to the power line B. It is clear, then, that the power relay 10 cannot operate unless relay 11 is energized to close its contacts 65—66, and relay 11 is energized only by plus battery passing through rectifier 42. However, before this battery can be applied to the center tap conductor 38 from the transmission lines L1—L2, it is necessary that relay 15 be energized through the cold cathode tube 17. This is accomplished automatically in the following manner.

When the start button 60 is pressed, the closed switch 61 completes a delayed energizing circuit for relay 15 from the power main A through the rectifier 16, which provides a pulsating positive voltage through wire 49. At the point 68 in wire 49 the circuit divides into two branches, one branch going through the winding of relay 15 to the plate 51 of tube 17. A small filter capacitor 69 smooths out the pulsating voltage. The other branch circuit goes from point 68 through resistor 58, closed relay contacts 59 (Fig. 2) and by wire 55 to the starting anode 53 of tube 17.

The capacitor 56 and resistor 57 constitute a delay network for the starting anode 53. The resistors 57 and 58 which are connected in series from the positive side of the circuit to the negative side formed by line B, are in shunt to the winding of relay 15 and the plate cathode path 51—52 of tube 17. In consequence of this shunt arrangement of the two branch circuits across the positive and negative lines of the D. C. circuit for relay 15, the voltage from rectifier 16 is divided by the resistors 57 and 58 to delay the placing of a firing voltage on starting anode 53. This delay need only be one second during which a sufficiently high positive voltage builds up on the anode 53 to fire the tube and cause a current flow across the electron path 51—52, whereby the relay 15 is energized. After firing, the tube 17 remains in operative condition to keep the relay 15 energized.

The purpose of the delayed energizing of relay 15 is to test the condition of the associated recorder in Fig. 2.

If this recorder is in use (that is, recording a message or even just connected to the main office), the relay contacts 59 are open and the starting anode 53 of tube 17 receives no voltage, so that the tube stays inoperative. Therefore, the relay 15 will not be energized when the start button is held down and the power for the machine will not be turned on. The patron cannot deposit his message because the chute 23 of the machine remains closed. On the other hand, if the recorder is not in use when the start button 60 is pressed, the relay 15 is energized and the following operations take place automatically and simultaneously.

We are to assume that the transmission lines L1—L2 normally carry a positive battery potential which is impressed at the main office as a standby condition of the system. The lines L1—L2 connect with the movable tongues 40′ and 41′ of relay 15. Normally these tongues engage their respective back contacts 70 and 71, which are connected to a pair of conductors 72 and 73. We need not follow those conductors further, because they lead into the recorder with which we are not concerned at this time.

When the relay 15 is energized, the tongues 40′ and 41′ engage their respective contacts 40 and 41, thereby connecting the lines L1—L2 to the output circuit of amplifier TP. From the center tap 37′ of transformer 37, the positive battery of L1—L2 goes through the rectifier 42 and through relays 11 and 12 by way of the closed switch 62 which puts ground on the battery circuit. The value of the positive current flowing in lines L1—L2 from the standby battery at the main office is sufficient to energize the relay 11 but is not strong enough to operate the relay 12.

The energized relay 11 closes its contacts 65—66, which complete the circuit of power relay 10 as follows, while the button 60 is being held down: From the main lead A, through conductor 63, closed switch 61, rectifier 16, through the winding of relay 10, wire 64, contacts 65—66 of relay 11, and by wire 67 to power line B. The energized relay 10 closes all of its four contacts 74 to 77. Upon release of the start button 60, the relay 11 releases but the relay 10 locks from line A through the closed contact 74, rectifier 16, and one the other side from point 78 through wire 78′, closed contact 75, wire 79, closed contact 80 of relay 12 (not energized), conductor 81, closed contact 82 of relay 14 (not energized), and by wire 83 to the other side B of the power circuit. The patron is informed of the power being on by the lighting of the red pilot lamp 22, which stays on as long as the relay 10 is energized.

The closed contact 74 of relay 10 connects an auxiliary power lead A′ with the main lead A, whereby circuits are established for the drum motor 26, the chopper motor 28, the power input terminals 33 of amplifier TP and a transformer 84 which operates the exciter lamp 27. Although the motor 26 is running, the scanning carriage 26′ is not moving because the magnet 29 is still unenergized. At the same time the chute magnet 24 is energized from A′ through wire 85, closed contact 86 of relay 12 (not energized), wire 87, closed contact 77 of power relay 10, through lamp 19 and the winding of chute magnet 24, and through closed switch contacts 88—89 to power line B. The energized magnet 24 withdraws the cover 23′ and opens the message chute 23. The associated lamp 19 goes on to advise the patron that he can now deposit the telegram.

As soon as the power relay 10 is energized and before the telegram is deposited, the optical scanner sends out white signals from the bare surface of the rotating drum 25. These signals constitute the carrier frequency of the system (usually 2500 cycles per second). For reasons that will appear later, it is desirable that these pre-scanning white signals shall have the same voltage as the white signals coming from the background of a scanned telegram sheet. For that purpose, the drum is painted a pale yellow like that of the familiar telegram forms of Western Union.

Attention is called to the fact that the relay 11 operates as a safety device for the message chute 23. The closed contact 76 of energized relay 10 shorts the coil of relay 11 to ground, causing the relay 11 to deenergize when the power relay 10 operates even before the start button is released. In the event that the transmission line from the main office is down (whether open or grounded), the relay 11 will not operate when the button 60 is pushed, so that the power relay 10 will not be energized and the chute will not be open to accept a telegram. Therefore, the opening of the message chute 23 is an assurance to the patron that the machine is in operative condition to receive his message, which he will now deposit.

The normally closed contacts 88—89 through which the chute magnet 24 is energized are associated with the drum 25 in such a way that, as the deposited message sheet is wrapped around the drum, it automatically lifts the spring arm 89 away from the contact 88 and moves it against an adjacent contact 90. The contact 88 may be the metallic drum itself and the other contact 90 may be a microswitch actuated by the arm 89. The opening of switch 88—89 breaks the circuit of magnet 24 and the "Deposit Telegram" lamp 19, so that the chute 23 is closed and the lamp goes out. The closing of switch contacts 89—90 shunts out the relay contacts 80 and 82 and completes the locking circuit of relay 10 from point 91 through wire 92 to the power lead B. It will thus be seen that, once a message has been deposited in the transmitter, the chute 23 is locked and the control of the power relay 10 is taken away from the relays 12 and 14 during the transmission cycle.

*Recorder circuits at the main office (Fig. 3)*

Figure 3:
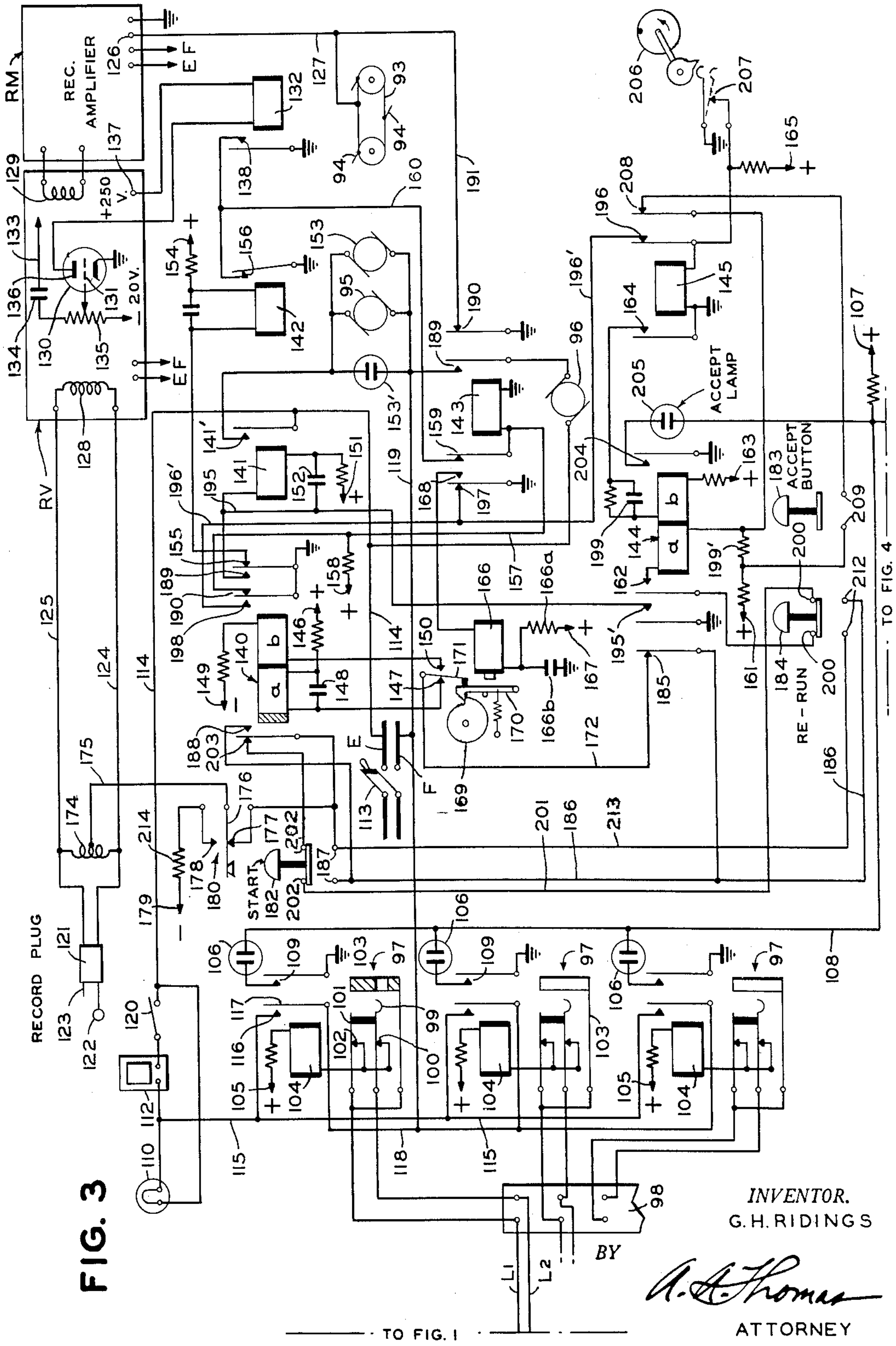
Fig. 3 is a diagram of the circuits associated with any one of the recorders at the main office.
Figure 4:
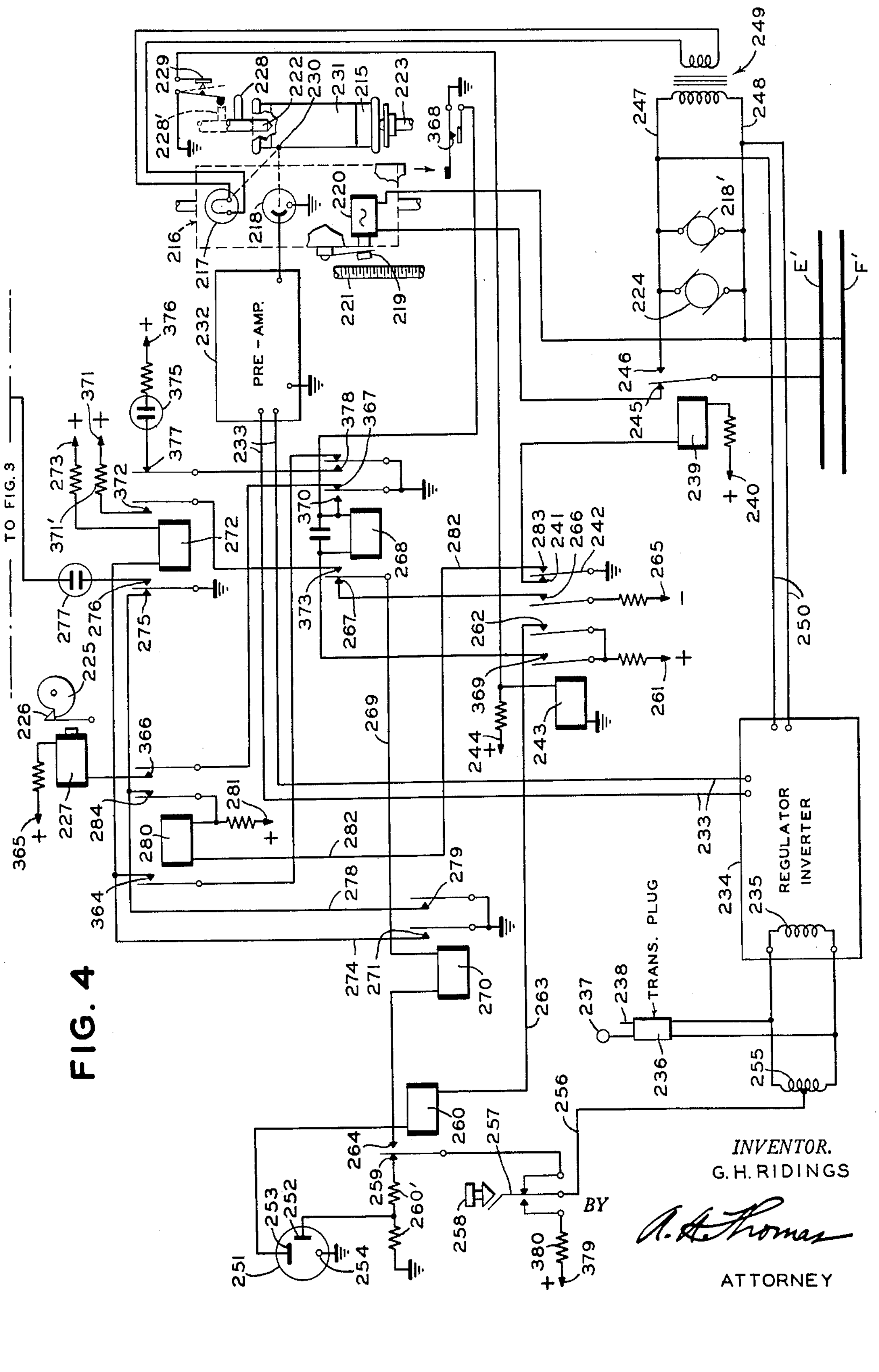
Fig. 4 illustrates the circuits of a main office transmitter.

With the deposit of a telegram in the patron's transmitter of Fig. 1, we turn our attention to the recorder equipment at the main office as shown in Fig. 3. As previously mentioned, the circuits in this diagram are based upon a multi-stylus machine like that disclosed in the pending application of Hallden and Zabriskie, Serial No. 83,333, filed March 25, 1949, to which reference may be had for structural details not necessary to show or describe in this application. For the purpose of the present description I need only point out that the recording mechanism of this machine comprises an endless metal belt 93 on which three styluses 94 are mounted to record the received facsimile signals on a continuous sheet fed from a supply roll. The stylus belt is driven by a motor 95 and the paper is fed over a suitable supporting platen (not shown) by a motor 96. The styluses are moved rapidly across the paper in a straight line as the paper moves slowly upward.

The installation at the main office includes a series of jacks 97, one for each out-station, and each jack is connected to its own out-station by a pair of lines L1—L2. Three jacks 97 are shown in Fig. 3 by way of example, but I need only describe the connection of the first or top jack, for the connections of the other jacks are the same and go to a common terminal strip 98. The contacts of each jack 97 consist of a tip spring 99 normally closed against a fixed contact 100, a spring arm 101 normally engaging a fixed contact 102, and a sleeve contact 103. The spring contacts 99 and 101 are mechanically connected by an insulating block and move as a unit.

The tip spring 99 is permanently connected to the line L2, and the sleeve 103 is connected to the other line L1. The fixed contacts 100 and 102 are connected to one side of a relay 104 and the other side of this relay is always connected to a source of positive battery 105 (say, 120 volts). This battery circuit is normally open at the out-station, so that the line relay 104 is not energized. As shown in Fig. 3, each subscriber's jack 97 has a relay 104 associated therewith.

The individual jacks 97 are mounted on a panel and directly above each jack is a calling lamp 106, shown here as a neon lamp. Accordingly, each subscriber or out-station is identified on the panel by a particular jack and the associated lamp. For example, jack No. 1 represents out-station No. 1, jack No. 2 represents out-station No. 2, and so on. Therefore, when a signal lamp 106 lights, the operator at the main office knows instantly which out-station is preparing to send a telegram. It will be assumed here that the first or top-most jack in Fig. 3 represents the out-station of Figs. 1 and 2. One side of each calling lamp 106 is connected to plus battery at terminal 107 by a common conductor 108, and the other side of each lamp is connected to a normally open contact 109 of the associated relay 104. When this relay is energized, its contact 109 is grounded and the associated lamp lights up to indicate the calling station.

In addition to the individual calling lamps 106 I may also use a large signal lamp 110 and a buzzer 112 which automatically operate when any out-station is calling so as to attract the operator's attention if she should happen to be away from the panel. The signals 110 and 112 are energized from a local source of A. C. power (say, 120 volts and 60 cycles) represented in Fig. 3 by a pair of bus bars E—F which are connected in circuit by a suitable hand switch 113. A conductor 114 connects one side of the signals 110 and 112 to bus bar E and another conductor 115 connects the other side of those signals to the normally open front contact 116 of each relay 104.

The tongues 117 of all relays 104 are connected in parallel to a conductor 118, which goes by wire 119 to the other bus bar F. Therefore, when any relay 104 is energized and closes its contact 116, the common lamp 110 lights and the buzzer 112 sounds to let the operator know that an out-station is calling. The particular station putting in the call is identified by its own signal lamp 106 which goes on at the same time. If desired, the buzzer 112 may be cut out by a hand switch 120.

The recorder of Fig. 3 has a plug 121 for insertion into the jack 97 of the calling subscriber. The plug has a tip contact 122 and a sleeve contact 123. When the plug 121 is inserted into any jack 97, the tip 122 engages the jack tip 99 and the sleeve 123 of the plug makes contact with the jack sleeve 103 whereby the spring arms 99 and 101 of the plugged jack are lifted away from their respective contacts 100 and 102. The plug contacts 122 and 123 are connected to a pair of conductors 124 and 125, which constitute the signal input circuit of a regulator inverter RV. The inverted amplified output of this unit is fed into a recording amplifier RM, which has an output terminal 126 connected by a conductor 127 to the electric styluses 94 of the recording mechanism.

The signal receiving units RV and RM, which are powered from the local source E—F, are illustrated schematically in block outline because their constructions do not form part of this invention. Hence, only a brief mention of their operation will be necessary for this description. Between the signal input coil 128 and the output coil 129, the regulator inverter RV contains various electrical devices adapted to regulate, invert and shape the signals for the recording circuit. The only part in RV requiring attention here is a tube 130 whose grid 131 controls the phasing operation of a relay 132. The grid 131 is kept at a negative potential (in this case 20 volts) which prevents operation of the tube. The signal voltage is tapped off a wire 133 and is impressed on the grid 131 through a capacitor 134 and a variable resistor 135. The plate 136 of tube 130 is connected to one side of relay 132 and the other side of this relay is connected to a terminal 137 which stands at a constant positive voltage (here marked as 250 volts).

It will thus be seen that the circuit of relay 132 goes through the plate-cathode path of tube 130 and is therefore closed only when the tube fires. As I shall describe later, when the patron's transmitter scans a black mark on the message sheet, the signal voltage is at a minimum and therefore ineffective to overcome the negative bias on grid 131. Consequently, the tube does not operate on a black signal. However, when the white or unmarked background of the message sheet is being scanned, the positive signal voltage is high enough to overcome the negative bias on grid 131 and the tube fires, thereby energizing the relay 132 which closes its contact 138 to ground. It will be understood, then, that the relay 132 pulses in synchronism with the line signals; that is, it operates on white signals and releases on black signals. How the pulsing of relay 132 phases the recorder will shortly be explained.

In addition to the pulsing relay 132 there are six other relays numbered 140 to 145 for operating the various control circuits associated with the main office recorder. The line relay 140 consists of two coils **140*a* and 140*b*. One side of coil 140*a* is connected to plus battery at 146 and the other side of this coil goes to a switch contact 147. A capacitor 148 is shunted across the winding 140 to make it slow to release. The other winding 140*b* is connected at one side to a source of negative potential 149 and the other side of the winding goes to a switch contact 150. The two coils 140*a* and 140*b*** may thus be distinguished as the positive coil and the negative coil, respectively.

The relay 141 is connected to plus battery at 151 and is shunted by a capacitor 152 for slow release. When the relay 141 is energized, its closed contact 141' completes the circuit of the belt drive motor 95 from the bus bars E—F. A second motor 153 is also energized at the same time to drive a fan for removing the stylus fumes. The delayed release of the relay 141 is so timed that it occurs during the interval between the release of relay 140 and the energizing of relay 144, as explained later. A red neon lamp 153' goes on to signalize the running of motors 95 and 153.

The relay 142, also shunted by a capacitor for slow release, is normally energized from plus battery 154 to ground through the closed contacts 155 of the relay 140. The grounding contacts 156 of relay 142 are shown closed to indicate the normally energized condition of the relay. The purpose of making relay 142 slow to release is to allow the belt motor 95 to reach synchronous speed before the machine is phased, as will presently be understood.

The relay 143, called the phasing relay, is connected at one side by wire 157 to positive battery 158 and the other side of the relay is grounded. However, the relay winding is normally shorted out by the closed contacts 159, wire 160, and the closed grounded contacts 156 of the energized relay 142. Therefore, the phasing relay 143 cannot operate until the relay 142 releases.

The relay 144 consists of two coils **144*a* and 144*b*. One side of coil 144*a* is connected to plus battery 161 and the other side of the coil goes to its front contact 162. The coil 144*b* is connected at one side to plus battery 163 and the other side of that coil goes to a normally open contact 164 of relay 145. One side of relay 145 is connected to plus battery 165 and the other side of the relay is grounded. As will appear later, the relay 145 operates upon completion of the recorded message to energize the relay 144** which holds the circuit until the massage is accepted by the main office operator.

The relay 143 controls a phasing or clutch magnet 166, which is connected at one side to plus battery 167 and at the other side to a normally open contact 168 of relay 143. When this relay is energized, the contact 168 is grounded and completes the circuit of magnet 166. One side of this magnet is connected to battery 167 through a resistor-capacitor combination **166*a*—166*b*. In standby condition the capacitor 166*b* has full battery voltage (say, 120 volts) placed across it. Consequently, when the circuit of magnet 166 is first completed to ground, it takes a high surge of current for a fast pull-up, thereby minimizing a delay in phasing. After its first surge the battery current reduces to the value determined by the resistance of the magnet winding in series with resistor 166b**.

The function of magnet 166 is to release a cam 169 which is normally locked by the armature bar 170 of the magnet. It is to be assumed that the drive connections between the synchronous motor 95 and the stylus belt 93 include a clutch which normally keeps the belt stalled by the stop cam 169 even when the motor 95 is running. The details of this driving connection are set forth in the aforementioned application of Hallden and Zabriskie. It suffices to say here that when the magnet 166 is energized, the armature 170 swings toward the magnet and releases the cam 169, whereupon the stylus belt 93 starts moving. When the magnet 166 releases, the armature 170 is pulled back by a spring against the cam 169 to stop the stylus belt.

The phasing magnet 166 when energized also performs the function of changing the line battery potential through relay 140 from positive to negative. A switch arm 171 connected to a wire 172 normally engages the contact 147 to which the positive winding 140a is connected. When the magnet 166 is energized, the armature 170 moves the switch arm 171 against the contact 150 to which the negative winding 140b is connected. In other words, the line relay 140 operates on positive battery when the phasing magnet 166 is unenergized and operates on negative battery when the magnet is energized.

A transformer coil 174 is placed across the lines 124—125 and a conductor 175 connects the battery circuits of the transmitter to the center of the coil. The transformer 174 with its center tap corresponds to the transformer 37 at the patron's transmitter, so that all controls between the connected machines are on a so-called simplex basis. That is, the battery potential goes to the center taps of the line coupling transformers and divides into two paths over the transmission lines L1—L2. The center tap lead 175 goes to a switch arm 176 which normally engages a contact 177. An associated contact 178, which is normally open, is connected to a source of negative battery 179. For convenience I shall refer to the assembled switch contacts 176—177—178 as the release button 180, which is located behind a locked door and is accessible only to a supervisor for the purpose of disconnecting the out-station transmitter under special circumstances to be described later.

The recorder of Fig. 3 is provided with a button 182 for starting the machine after insertion of the plug 121. There is also a button 183 which is operated to acknowledge the acceptance of a recorded message, and another button 184 which the operator presses when she desires a retransmission of the message. The circuits controlled by the buttons 182, 183 and 184 will be described when I come to explain the operation of the system in transmitting a message from out-station to main office.

To promote simplicity and clearness in the circuit diagram of Fig. 3, the battery sources for the control circuits have been referred to in the foregoing description by conveniently placed terminals marked plus or minus (as required) and identified by different reference numbers to assist in tracing the circuits. Actually, of course, there is but a single source of direct current for the main office machines such as a storage battery, a D. C. dynamo, or a rectifier connected to the 60 cycle power supply E—F. Therefore, when I speak of plus and minus battery in the description and claims, I include any suitable source of direct current potential.

Further, throughout the specification and claims I use the terms plus and minus (or positive and negative) in reference to battery potentials in the broad sense of opposite polarities. That is to say, where I speak of certain control circuits as being of positive battery and other circuits of negative battery, I mean that those polarities can be reversed.

*Transmission from out-station to main office (from Fig. 1 to Fig. 3)*

Referring to Fig. 1, a patron wishing to send a telegram pushes the start button 60 and holds it down for a second, thereby closing both switches 61 and 62. Switch 61 connects the rectifier 16 to power main A and causes operation of the cold cathode tube 17 to energize the relay 15 after a delay of about one second, as heretofor explained. When the relay 15 is energized, its closed contacts 40 and 41 connect the transmission lines L1—L2 to the center tap of transformer 37.

It will be recalled that at the main office (Fig. 3) a positive standby potential is kept on lines L1—L2 through all the relays 104 and the associated jack contacts 100 and 102. Normally, that positive potential stands open to ground at the open contacts 62 of the patron's start button 60. However, upon operation of this button, the switch contacts 62 are closed to complete the line circuit, so that positive current flows through the line relay 104 at the main office and through the rectifier 42 and the relays 11 and 12 in the patron's transmitter. This positive current is of such value (about 25 mils in the present installation) that it will energize the relay 11 in Fig. 1 and the relay 104 in Fig. 3, but it will not be sufficient to operate the patron's relay 12 which is shunted by the resistor 45.

The operated relay 11 closes its contact 65 to energize the power relay 10 and the pilot lamp 22. The closed contact 74 of relay 10 shorts out the start button 60 which the patron can safely release when he sees the red lamp 22 lighted. Upon release of button 60 the relay 10 locks through its own contacts 74 and 75, as previously explained, and automatically accomplishes these results:

Power is supplied to amplifier TP and excited lamp 27 through the A'—B terminals, so that the scanning mechanism sends out white signals on the carrier frequency over the lines L1—L2. These signals do not interfere with the simplex battery control. The closed contact 76 of relay 10 keeps ground on the positive side of rectifier 42. The magnet 24 is energized and opens the chute 23, while the lighted lamp 19 tells the patron to deposit his message. But before the message is deposited let us see what happens at the main office when the start button 60 is pressed.

Referring to Fig. 3 the relay 104 became energized when ground was placed on the standby battery circuit at contact 76 of the energized power relay 10 in Fig. 1. The closed contact 109 of the energized relay 104 lights the signal lamp 106 above the calling jack 97. At the same time, the large common lamp 110 and the buzzer 112 (if used) are energized to call the operator's attention to the jack panel. The operator answers the call by connecting the recorder plug to the jack under the lighted lamp 106, then pressing the start button 182. These two manual operations—inserting the plug and pressing the start button—automatically open the standby battery circuit from terminal 105 and deenergize the line relay 104, whereby the signals 106, 110 and 112 are disconnected.

At the same time, a positive simplex circuit is completed from the positive battery terminal 146 through the coil 140a of relay 140, closed contact 147, wire 172, closed contacts 185 of relay 144 (not energized), conductor 186, across the closed switch contacts 187 of the depressed start button, through closed contacts 176—177 of the release button 180, by wire 175 to the center tap of the line coupling transformer 174, and from there over the lines L1—L2 to the transmitter in Fig. 1, where the positive circuit is grounded at 76. The relay 140 is thus energized and its closed contact 188 shorts out the start button 182, so that the positive simplex circuit is maintained when the start button is released as long as the relay 140 is energized.

At the transmitter in Fig. 1, a normal current (of about 25 mils) flows over the line through the positive rectifier 42, through relay 12 and the shunt resistor 45 to ground at 76. This shunt resistor is so adjusted that it prevents the relay 12 from being operated by a current value of 25 mils, this relay being designed to operate on a higher current value (say, 50 mils) which is supplied at a later point in the transmission cycle. However, the normal simplex current of positive potential is sufficient to energize the coil 140*a* of relay 140 in Fig. 3.

The energized relay 140 operates its three armature contacts to accomplish the following results: The closed front contact 189 puts ground on relay 141, which is energized from the positive battery terminal 151. The closed contact 141′ of relay 141 connects the belt driving motor 95, the signal lamp 153′ and the fan motor 153 to the bus bars E—F, this being the sole function of relay 141. The opened contact 155 of the energized relay 140 releases the normally energized relay 142 which opens its contact 156 for a purpose that will soon be clear.

Up to this moment, the two connected machines are in this condition: At the patron's transmitter, Fig. 1, the empty drum 25 is running, the optical scanning mechanism is energized and the chute 23 is open for the deposit of a telegram. With no blank on the drum, a continuous white signal is sent over the lines L1—L2. At the main office recorder, Fig. 3, the white signals from the out-station transmitter keep the tube 130 of the regulator-inverter RV in operation, as previously explained, so that the relay 132 is continuously energized and its contact 138 is held grounded. The belt drive motor 95 is running, but the stylus belt 93 is not moving because the stop cam 169 is still locked.

Referring to the out-station transmitter in Fig. 1, let us assume that a telegram has been dropped into the open chute 23 and wrapped around the fast rotating drum 25. The scanning of the black mark 25*a* on the message blank causes a succession of black signals to be sent over the lines L1—L2, in this particular case at the rate of three signals per second.

At the main office recorder in Fig. 3, the black phasing signals deenergize the tube 130 and cause the relay 132 to follow the signal pulses, so that the contact 138 opens in unison with the phasing signals. The phasing relay 143 is normally kept deenergized by three ground leads which short out its coil. One ground is removed by the opened contact 190 of energized relay 140. The second ground is removed when relay 142 releases and opens its contact 156. This occurs after a slight delay, since relay 142 is slow to release in order to let the synchronous motor 95 get up to speed before the phasing relay 143 operates. Therefore, up to the moment when the phasing pulses start coming over, there is only one grounded shunt left to be removed from the phasing relay 143, namely, the ground that goes through the closed contact 138 of relay 132, which the white signals coming from the bare transmitter drum have kept energized without pulsing.

Now, when the black phasing signals start coming over from the out-station after deposit of the telegram, the pulsing of relay 132 intermittently makes and breaks the last shorting ground of relay 143. Therefore, at the next opening of contact 138 after the release of relay 142, all short circuits around the phasing relay 143 are removed and this relay will now energize. This is the phasing moment of the recorder. The opened contacts 159 of relay 143 remove the ground circuit to relay 132, so that further pulsing of this relay will have no effect on the phasing relay 143, which stays energized.

The closed contacts 189 of relay 143 connect the paper feed motor 96 to the bus bars E—F, and the closed contacts 163 complete the circuit of clutch magnet 166, which releases the stop cam 169, whereupon the stylus belt 93 begins to turn. The opened contacts 190 of energized relay 143 disconnect the shorting wire 191 from the stylus lead 127, so that the styluses are ready to record signals. When the magnet 166 is energized, it shifts the switch arm 171 from the contact 147 to 150, whereby the battery line circuit is transferred from positive to negative. Hence, the coil 140*a* of line 140 is cut out and coil 140*b* is connected to negative potential at terminal 149. This potential is impressed on lines L1—L2 through circuits previously traced for coil 140*a*. The capacitor 148 across coil 140*a* makes that coil slow to release, so that the relay 140 will not deenergize during the transfer moment from positive to negative battery. With the stylus belt 93 moving and the paper feed motor 96 in operation, the main office recorder is now ready to record the patron's deposited message.

At the out-station transmitter in Fig. 1, the negative battery potential put on lines L1—L2 goes through the negative rectifier 43, through relays 13 and 14, and by wire 192 through a normally closed switch 193 to ground. The normal negative current in this circuit (about 25 mils) is sufficient to energize the relay 13, but will not operate the relay 14 because of its shunt resistor 48. The closed contacts 194 of the energized relay 13 complete the circuit of magnet 29 which connects the optical scanning carriage 26′ with the motor 26. This starts the scanning of the deposited message, and the facsimile signals after passing through the amplifier TP are sent over the line to the main office recorder. The lighted lamp 20 tells the patron that his message is being transmitted.

At the main office recorder, the facsimile signals are impressed on the styluses 94, which are carried rapidly by the belt 93 across the slowly moving paper for line-by-line recording in a manner well understood by those skilled in this art.

*At close of transmission from out-station to main office*

When the scanning carriage 26′ of the patron's transmitter has moved along the drum 25 a certain distance (indicated by dotted outline 26*a* in Fig. 1) after scanning the entire message blank, the carriage opens the switch 193, called the end-of-message switch. The opening of this switch removes ground from the negative simplex circuit which was maintained on the lines L1—L2 from the main office recorder during the entire transmission. To insure that the simplex circuit is held open long enough (before the switch 193 closes again upon release of the scanning carriage) to allow the deenergizing of relay 13 in Fig. 1 and relay 140 in Fig. 3, the relay 13 is made slow to release by the capacitor 47, thereby keeping the magnet 29 energized a second longer. This holds the scanning carriage in position to keep the switch 193 open until relays 13 and 140 release.

It will be seen, then, that the slow release of relay 13 is a safety factor that ensures the consistent release of relay 140 at the main office. Once released, both relays 13 and 140 stay that way until the next transmission operation. The opened contacts 194 of relay 13 deenergize the magnet 29 and the scanning carriage of the transmitter automatically returns to starting position, ready to scan the next message.

During the time (about one second) that the switch 193 is held open by the scanning carriage, the relay 140 in Fig. 3 releases and its closed grounding contact 155 energizes the relay 142, thus restoring the same to its normal energized condition. The opened contact 189 of deenergized relay 140 does not open the circuit of relay 141 because that circuit now goes to ground by wire 195, through closed contact 195′ of relay 144, which is energized at this time, as explained further on. The closed contact 190 of the released relay 140 short-circuits the coil of phasing relay 143, which releases and thereby disconnects the paper-feed motor 96 and the clutch magnet 166.

Let it be noted that the release of magnet 166 not only relocks the stop cam 169 but also causes the switch arm 171 to open the contact 150 and close the other contact 147. The opening of contact 150 breaks the negative simplex circuit through coil 140b of relay 140, so that negative potential will not be restored to the transmission lines L1—L2 when the end-of-message switch 193 at the transmitter is again closed upon return of the carriage.

Up to now the relay 145 has remained unenergized because its coil has been kept shorted by either one or both of two ground leads which go from the positive battery terminal 165 through the closed contacts 196 of the relay and by wire 196' to the back contact 197 of relay 143 and the front contact 198 of relay 140. During the recording of the message both relays 140 and 143 remain energized, so that the coil of relay 145 was kept shorted out through the closed contact 198 of relay 140.

Now, at the close of the scanning operation, when the relay 140 releases and causes the relay 143 to deenergize, there is a slight time delay between the releasing of those two relays owing to the slow release action of relay 143 as its coil becomes shorted out. During this brief interval of delay, when the relay 140 is deenergized and the relay 143 is still energized, both short circuits of relay 145 are open and this relay has enough time to energize and open its contacts 196. Therefore, when the relay 143 releases it can not again short out the relay 145, which now stays energized.

The closed contact 164 of energized relay 145 puts ground on coil 144b of relay 144 and causes a surge of current to flow through an electrolytic capacitor 199. The relay 144 pulls up and closes its contact 162, which completes a positive battery circuit from terminal 161 through a resistor 199', coil 144a, closed switch 200 of button 184, wire 201, closed switch 202 of start button 182, closed contact 203 of released relay 140, closed switch 176—177 of button 180, to center tap of simplex transformer 174, and over the lines L1—L2 to the outstation transmitter. There, this positive battery goes through the positive rectifier 42 and to ground by way of the closed contact 76 of the energized power relay 10. The relay 144 therefore stays energized through coil 144a independently of coil 144b, and its closed contact 204 causes an "Accept" lamp 205 to light from battery terminal 107.

The closed contact 195' of energized relay 144 causes the relay 141 to stay energized in order to keep the power on the belt motor 95, lamp 153' and fan motor 153. This holds the recorder in standby condition in case it is necessary to make a second recording of the same message, as about to be described.

The operator at the main office, seeing the "Accept" lamp 205 lighted, knows that the transmission is over and pulls out the recorded section of the paper by operating a handwheel 206, as fully explained in the application of Hallden and Zabriskie already referred to. One complete turn of the wheel 206 feeds out a standard length of telegraph blank, which is then torn off against a knife edge on the machine. This insures a uniform length for all recorded messages that are torn from the machine. As the handwheel 206 completes its turn, it briefly closes a switch 207 which places a shorting ground on the relay 145, which releases and closes its contacts 208.

*Operation of "Accept" button 183 in Fig. 3*

If the operator after turning off the recorded message finds it acceptable, she presses the "Accept" button 183 and holds it down for a second. The effect of closing the switch contacts 209 is to short out the resistor 199' which represents most of the series resistance in the positive simplex circuit now going over the lines L1—L2. The removal of resistor 199' causes the simplex current to rise to a high level (about 70 mils in this case) which is sufficient to operate the relay 12 in Fig. 1.

The opened contacts 44 of energized relay 12 remove the shunt resistor 45 so that the relay will now hold up on normal simplex current (assumed here as 25 mils). This is a safety feature that prevents the relay 12 from deenergizing before the proper time in case the operator at the main office should release the "Accept" button 183 too soon. In that event the resistor 199' would be put back into the positive simplex line to reduce the current to normal but the relay 12 at the transmitter would remain energized.

The energizing of relay 12 performs several functions in shutting down the out-station transmitter. The closing of contact 210 energizes the magnet 29' to strip the scanned message blank from the drum 25 which is still rotating. As fully described in the Wise and Ridings Patent No. 2,262,715, the armature of the blank stripping magnet carries a blade which slips under the leading edge of the blank on the drum and automatically peels it off as the drum turns, causing it to fall into a receptacle below. This feature is not a part of the present invention. The operation of magnet 29' is accompanied by the lighting of lamp 21 which illuminates a sign "Telegram accepted" as information for the patron.

After the blank has been removed from the drum 25 which is still rotating, the contacts 88—89 automatically close, but the chute magnet 24 will not be energized because its circuit is broken at the opened contact 86 of the energized relay 12. The opened contact 80 of relay 12 breaks the circuit of the power relay 10 which has remained energized up to this moment. Because the drum contacts 89—90 are opened before the message is completely peeled from the drum, it is necessary to maintain power on the drive motor 26 for a few moments after the drum contacts open.

This delayed release of relay 10 is obtained by means of a capacitor 211 placed across the relay coil and kept charged from the rectifier 16 as a source of direct current. Therefore, upon opening of the drum contacts 89—90, the capacitor 211 sends its charge through the relay 10 which maintains the circuit of motor 26 through contacts 74 long enough to rotate the drum until the blank has been entirely peeled off.

When the power relay 10 releases and opens its contacts 74, it breaks the connection between the leads A and A', thereby deenergizing the motors 26 and 28, the red pilot lamp 22, exciter lamp 27, relay 15, magnet 29' and the lamp 20. The opening of contact 76, as well as the deenergizing of relay 15, breaks the positive simplex circuit through relay 12, which now releases. At this point the outstation transmitter is back in normal shutdown condition.

At the main office recorder the opening of the positive simplex circuit by the release of power relay 10 in Fig. 1 denergizes the relay 144 and the opened contacts 162 break the circuit of relay 141, thereby disconnecting the lamp 153' and the motors 95 and 153. The operator pulls out the plug 121 and the recorder is now completely shut down, ready to accept a new call.

*Operation of re-run button 184 in Fig. 3*

It may happen that the operator at the main office upon examining the recorded message torn from the roll in the machine is not satisfied with the received copy, say, because it is either too dark or too light in spots. In that case, or if another copy is desired for any reason whatever, the operator does not push the "Accept" button 183 but the "Re-run" button 184. At this stage of the operation all relays are in their normal standby condition except the relay 144 which is still energized.

When the "Re-run" button 184 is pushed in, its contacts 200 are opened and the contacts 212 are closed. The opened contacts 200 break the circuit of coil 144a of relay 144, which thereby releases and opens the positive simplex circuit from battery terminal 161. At the same time the closing of relay contacts 185 restores positive battery through the coil 140a of relay 140 from battery terminal 146. This circuit goes from coil 140a through switch contacts 147 and 171 (magnet 166 being deenergized), wire 172, relay contacts 185, wire 186, button contacts 212, wire 213, switch contacts 176—177, and from there through transformer 174 over lines L1—L2 to ground at the transmitter, where the power relay 10 is still energized.

The energizing of relay 140 starts the transmission cycle all over again, as fully explained in the preceding description. When the second copy is received at the recorder and found satisfactory, the operator pushes the "Accept" button 183 and the two machines automatically shut down in the manner described.

*Operation of release button 180 in Fig. 3*

Since the outstation transmitter is usually located in a public or semi-public place, it may happen that the start button 60 will be pushed by mistake (or through childish mischief) without a telegram being deposited. Such a false start of the transmitter will be indicated at the main office by the fact that the recorder which the operator plugged in to accept the call will remain idle after the start button 182 has been pressed. If the recorder fails to energize after a reasonable waiting period, the operator summons the supervisor who will press the release button 180.

As heretofore explained, when the operator plugs in a recorder in answer to a call and presses the start button 182, the line relay 140 is energized by positive battery from terminal 146 through the normally closed contacts 176—177 of the release button 180. When this button is depressed, the center tap of the simplex transformer 174 is connected by contact 178 of the negative battery terminal 179 through a low resistor 214, so that a high negative current (say, of 70 mils) is fed over the lines L1—L2.

At the transmitter in Fig. 1 this high negative current will go through the negative rectifier 43 and energize the relays 13 and 14. The energizing of relay 13 at this point is of no consequence, but the operation of relay 14 opens its contacts 82. With no telegram on the drum, the contact 90 is open and the power relay 10 can only lock through the relay contacts 80 and 82. Therefore, the opening of contacts 82 releases the relay 10, which will not be re-energized when the relay 14 is disconnected from the negative simplex circuit by the release of button 180. Hence, the falsely started transmitter shuts down, the call lamp 106 at the main office goes out, and the operator will unplug the recorder.

*Main office transmitter (Fig. 4)*

The transmitters used at present in the main office for operation in this system are of the optical scanning type, like the machine disclosed in the pending application of J. H. Hackenberg, Serial No. 122,326, filed October 19, 1949. In Fig. 4, I have shown only such parts of that machine as are needed to explain the novel circuits that control the function of the machine in the system.

The source of power for the transmitter in Fig. 4 is indicated by the bus bars E'—F' which are supposed to be the same as the bus bars E—F in Fig. 3 and represent a local house-lighting line of the usual 120 volts and 60 cycles. The optical scanning mechanism of the transmitter is represented schematically by a rotary drum 215 and a vertically slidable carriage 216 on which are mounted an exciter lamp 217, a photocell 218, a chopper motor 218', a spring supported half-nut 219 and a magnet 220. When this magnet is energized, it holds the half-nut 219 away from a rotary screw shaft 221. Upon being energized, the magnet releases the half-nut which instantly moves into driving engagement with shaft 221 to cause the downward scanning movement of carriage 216.

The rotary drum 215 is supported in vertical position between a pair of centers 222 and 223. The lower center 223 is drivingly connected with a synchronous motor 224, which also operates the screw shaft 221. The driving connections for the drum 215 and the screw shaft 221 include a friction clutch (not shown) and a stop cam 225 which is normally held locked by a detent 226 under the control of a magnet 227. This is the phasing or clutch magnet of the machine. Even when the motor 224 is running, neither the drum 215 nor the scanning carriage 216 will operate unless the magnet 227 is energized to remove the detent 226 from the cam 225. The mechanical details of these driving connections are fully set forth in the Hackenberg application.

The upper dead center 222 of the drum support is vertically movable and carries a lateral pin 228 arranged to close a normally open switch 229 when the drum is inserted. The switch closing position of pin 228 is indicated at 228'. It will be understood that, when no drum is in the machine, the switch 229 is open, while during the time that a drum is operatively supported in the machine, the switch remains closed. When a scanned drum is removed, the dead center 222 drops to the full line position shown and the switch 229 automatically opens.

Since optical scanning in facsimile machines is well understood, I need but say here that a beam of light from the exciter lamp 217 forms a scanning spot 230 on the message sheet 231 wrapped around the drum 215 and the light variations reflected from the message bearing surface of the sheet to the photocell 218 produce electrical signals corresponding to the black marks on the message area. These electric signals are sent on a carrier wave into a preamplifier 232 of well known construction. The output leads 233 of this amplifier go to a suitable regulator-inverter 234. The output coil 235 of this inverter is connected to a transmitter plug 236, which has a tip contact 237 and a sleeve contact 238. This plug is adapted to be inserted into an out-station line jack 97 in Fig. 3 when the main office has a message to transmit to a particular out-station.

The connections to the power mains E'—F' are controlled by a relay 239 which is normally energized from a plus battery terminal 240 through the closed contacts 241—242 of a normally energized relay 243, which receives current from a plus battery terminal 244. The relay 243 is slow to release for a purpose to be explained later. All the contacts of relays 239 and 243 are shown in Fig. 4 in operated position. The make contact 245 of the energized relay 239 closes the circuit of magnet 220 from the power leads E'—F' and the back contact 246 keeps the circuit 247—248 open until the relay 239 releases.

As long as there is no drum in the machine, the switch 229 is open and the relay 243 is energized, thereby keeping the circuit of relay 239 closed. When the message bearing drum 215 is placed in the machine, the switch 229 is automatically closed and shorts out the winding of relay 243 which instantly releases and opens the circuit of relay 239. The opened relay contact 245 deenergizes the magnet 220, so that the half-nut 219 engages the screw shaft 221. The closed relay contact 246 completes the circuit 247—248 from the bus bars E'—F' thereby energizing the drum motor 224, the chopper motor 218', the transformer 249, which feeds the exciter lamp 217, and the conductors 250 which supply power to the regulator-inverter 234. Although the motor 224 is running, the driving connections are still inoperative because of the locked cam 225, so that the inserted drum 215 and the scanning carriage 216 are not yet moving. In other words, the machine is waiting to be phased.

With the message bearing drum placed in the machine, the operator inserts the transmitter plug 236 into the proper jack 97. It will be recalled that normally a positive potential appears on the tip 99 and sleeve 103 of every jack from the plus battery terminal 105 through the associated line relay 104. This voltage also appears on the transmission lines L1—L2, but the positive simplex circuit at the out-station recorder is normally open (as will be seen when we come to Fig. 2), so that the full voltage supply, say 110 volts, appears on the jack terminals.

When the plug 236 is inserted into the jack, the positive potential energizes a cold cathode tube 251, which has a starting anode 252, a plate anode 253, and a grounded cathode 254. The tube energizing potential goes through the inserted plug 236 to the center tap of a transformer 255, wire 256, closed switch contact 257 of a button 258, closed contact 259 of a relay 260 (not yet energized) and through a resistor network 260′ to the starting anode 252 of tube 251.

When the tube 251 fires, the relay 260 is energized from plus battery terminal 261, closed contact 262 of the released relay 243, wire 263, through the winding of relay 260 and across the plate-cathode path of tube 251. The energized relay 260 opens its contact 259 and removes the positive potential from the starting anode 252 of the tube. However, once started, this tube continues to operate across the electronic path 253—254, so that the relay 260 remains energized. At the same time, the closed relay contact 264 completes a circuit from the negative battery terminal 265 through the closed contact 266 of released relay 243, closed back contact 267 of a relay 268 (not energized), by wire 269 through a relay 270, closed relay contact 264, closed switch contact 257, to the center tap of transformer 255, and from there through the inserted plug 236 to the transmission lines L1—L2.

The main office transmitter is now sending negative battery to the connected out-station recorder of Fig. 2. The effect of this negative battery on the recorder will be considered under the next heading.

The closed contact 271 of energized relay 270 completes the circuit of a relay 272 from plus battery terminal 273 through wire 274. The energized relay 272 opens its contact 275 and closes the other contact 276 which operates a neon lamp 277 from the battery terminal 107 (Fig. 3), as a signal to the operator that the transmitter is functioning. A wire 278 connects the back contact 275 of relay 272 with a front contact 279 of relay 270.

A relay 280, called the phasing relay, is connected at one side to a plus battery terminal 281 and at the other side to a wire 282 which goes to a back contact 283 of relay 243. However, the deenergizing of relay 243 upon insertion of the drum, as previously described, will not energize the relay 280 because the winding of that relay is short-circuited by two grounds which branch off from its closed back contact 284. One ground goes through the closed back contact 275 of relay 272 when the latter is not energized, and the other ground goes through the front contact 279 of relay 270 when the same is energized. It will, therefore, be understood that the phasing relay 280 is energized only at the moment when both grounds are removed, and that occurs only when the release of relay 270 coincides with the energizing of relay 272. It is important to remember this.

*Out-station recorder (Fig. 2)*

The facsimile recorder on which the circuits of Fig. 2 are based is a multi-stylus machine generally similar to the one used in the main office but differing therefrom in several particulars not necessary to go into here. Only such mechanical features of the recorder are shown in Fig. 2 as are required in describing the control of the machine when connected in the system of my invention. The machine itself, apart from this system, forms the subject matter of the Pollard application, filed December 19, 1950, Serial No. 201,608, previously mentioned.

The leads C—D represent a suitable source of current, such as a commercial circuit of 120 volts and 60 cycles. The scanning mechanism of this recorder (like the machine in Fig. 3) has an endless belt 285 which carries a plurality of horizontal styluses 286 arranged to engage a flat recording sheet 286′ supported in vertical position on a platen and fed from a continuous supply roll (Fig. 2A). The belt 285 is operated at high speed by a motor 287 and the paper is fed slowly over the platen by a second motor 288. A third motor 289 operates a suction fan to remove the fumes caused by the recording styluses. The belt drive includes a shaft 290 which carries a commutator 291 provided with an insulated segment 292 and a contact brush 293.

The transmission lines L1—L2 are connected by the conductors 72—73 to a recording amplifier RP of suitable construction. It will suffice here to indicate diagrammatically, as part of the amplifier, a signal input transformer 294, a signal input tube 295, a signal output tube 296, a power input transformer 297, and a positive voltage terminal 298 derived from a rectifier contained in the amplifier unit. The conductors 72—73 are connected to the ends of the primary input coil 294′ and the center of that coil goes through an adjustable resistor 299 to the center of two selenium rectifiers 300—301.

As indicated by the plus and minus signs of the rectifiers, these devices are connected in series so that positive battery will flow only through rectifier 300 and negative battery will pass only through rectifier 301. A relay 302 is connected to the plus side of rectifier 300 and the circuit of that relay is normally open at a contact 303 of a relay 304. One side of a relay 305, called the line relay of the recorder, is connected to the minus end of the rectifier 301 and the other side of that relay goes to the commutator brush 293 through a resistor-capacitor network 306 which serves as a spark killer.

The commutator brush 293 is shunted by a wire 307 which connects to ground through a normally closed contact 308 of a relay 309. Therefore, irrespective of the commutator, the negative battery sent over the lines L1—L2 from the main office goes from the center tap of transformer 294 through the negative rectifier 301 and through the relay 305 to ground at the relay contact 308. When the relay 305 is energized and closes its two front contacts 310 and 311, the closed contact 310 places a ground on the stylus belt 285 through a wire 312 to shunt out the styluses until the recording operation begins. Before the line relay 305 is energized, the stylus belt is grounded through a back contact 313 of a relay 314, which is called the power relay.

The closed contact 311 of energized relay 305 completes the circuit of the power relay 314 from the main line C through the closed contacts 315 of relay 302 (not energized), wire 316, contact 311 to junction point 317, wire 318, through the winding of relay 314, conductor 319 to point 320, and by wire 321 to conductor 322 which is connected to the other power line D. When the power relay 314 pulls up, it locks through the front contact 323. Simultaneously with the operation of relay 314, the power input transformer 297 of amplifier RP is energized through conductors 318 and 319 which connect the transmitter in shunt to relay 314.

The energizing of line relay 305 lights the "Line Busy" lamp 18 of the associated transmitter (Fig. 1), thereby informing the out-station attendant that the recorder is connected with the main office.

Another circuit from the junction point 317 goes through relay 304 by way of its closed contact 324, so that this relay is energized from the C–D power leads. The energized relay 304 opens its back contacts 59 and 324, and closes its front contacts 303 and 325. The opened contact 59 prevents the relay 15 of the transmitter (Fig. 1) from being energized, thereby keeping that machine out of operation if its start button 60 should be pressed. The energized relay 304 locks through its closed contact 325 through a normally closed switch 326—327 and through the closed contact 315 of relay 302. The switch contact 326 is a movable spring arm connected to relay contact 325 by a wire 328 and the other contact 327 goes by wire 328′ to conductor 316 which is connected to the power lead C as long as relay 302 is unenergized.

It may be mentioned here that the relay 302 remains unenergized during the entire recording operation and operates only under special circumstances to be explained later. Consequently, the contact 315 stays closed and the relay 304 remains energized until the recorder has gone through its complete cycle.

Referring to the recorder-amplifier RP, the plate of the signal output tube 296 is connected to the stylus conductor 312 through a capacitor 329 to keep out the simplex battery current, and a conductor 330 connects the plate to the positive voltage terminal 298 through a choke 330' which keeps the alternating current signals out of conductor 330. The other end of conductor 330 goes to the armature contact 331 of a relay 332 which is connected by a wire 333 to the cathode of tube 296, the other side of the relay being grounded. Thus the relay 332 is in series with the plate-cathode path of tube 296 and can not be energized to close its contacts 334 and 335 until the tube has heated up sufficiently to fire.

The closed contact 334 of energized relay 332 puts power on the motors 287—288—298 through conductors 322 and 336 which are connected to the power leads D and C, respectively. The closed contact 335 completes the circuit of relay 309 from the battery terminal 298 of the amplifier through a resistor-capacitor network 337 which delays the energizing of relay 309 sufficiently to allow the belt driving motor 287 to acquire synchronous speed.

The energized relay 309 switches the conductor 307 from the grounded contact 308 to its front contact 338, whereby the line relay 305 is shunted out of the negative simplex line and in its place is inserted the resistor-capacitor network 306 which is in series with the phasing commutator 291. Thus, the line relay 305 is released and opens its contacts 310 and 311. The opened contact 310 removes ground from the stylus belt 285, but the opened contact 311 leaves the power relay 314 and the busy lamp 18 energized. The locking circuit of relay 314 goes from conductor 316 (connected to main line C) through a normally closed switch 339—340, closed contact 323 of the relay, then by way of conductors 319, 321 and 322 to the main line D.

While the out-station recorder, like the one at the main office, operates on a continuous sheet fed slowly from a supply roll, there is this difference in the paper feed operation at the end of a message: Whereas in Fig. 3 a uniform length of message sheet is measured out by means of the hand wheel 206 and then manually torn off, the recorder in Fig. 2 contains automatic provisions for feeding out a uniform length of message sheet and then cutting it off. These automatic provisions are an integral part of the machine on which the circuits of Fig. 2 are based and, as previously stated, the machine of Fig. 2 considered as a piece of apparatus separate from the system is not my invention but forms the subject matter of application Serial No. 201,608, filed December 19, 1950. Therefore, I have schematically included in the circuits of Fig. 2 only such elements of the automatic paper feeding and cutting mechanism as are necessary to explain the circuits and the operation of the system.

We are to assume that the driving connections operated by the paper feed motor 288 include a disk 341 which makes one revolution while the motor feeds out a predetermined length of paper on which the transmitted telegram has been recorded. The length of paper thus measured out is always the same, and as the disk 341 completes its turn a pin 342 on the disk strikes the spring arm 339 and moves it against a contact 343. This closing of contact 343 is only momentary, for the switch arm 339 snaps back against the contact 340 as soon as released by the revolving pin 342. In the actual machine, the three switch contacts 339, 340 and 343 are contained in a small microswitch.

The opening of switch contact 340 breaks the circuit of the power relay 314 and the closing of switch contact 343 initially energizes a knife motor 344 from the leads C–D through conductors 316 and 322. At the same time, a relay 345 is energized and its closed contact 346 completes another circuit through the motor 344 from conductor 316 through wire 347 to point 348, wire 349, through closed switch contacts 350—351, closed relay contact 346 and by wires 321—322 to the power line D. The relay 345 locks through its closed contact to keep the motor 344 running as long as the switch contacts 350—351 remain closed. A second contact 352 associated with the spring arm 350 is normally open and is connected to a conductor 353. The contacts 350—351—352 constitute a microswitch automatically operated by the knife motor 344 in the following manner:

The motor 344 operates a pivoted knife 354 mounted to swing horizontally forward to cut off the measured length of recorded sheet 355. In Fig. 2A the dotted line 355' indicates the horizontal cutting line of knife 354. The operating connections between the motor 344 and the knife 354 include a cam disk 356 which connects with the knife through a link 357 and carries a radial pin 358 arranged to engage the spring arm 350. As the disk 356 turns, the pin 358 engages the spring arm 350 briefly and tensions it so that upon release the bent arm snaps momentarily against the contact 352. This closes the circuits of a relay 359, a buzzer 360 and a lamp 361 from conductor 316 (connected to the power line C) to the return conductor 322. The relay 359 locks these energizing circuits through its contact 362 when the spring arm 350 releases and opens the contact 352. Therefore the relay 359 remains energized when the spring arm 350 opens the contact 352 during the return swing of the knife 354.

The knife 354 carries a pair of spaced prongs 363 arranged to engage the message sheet 355 and press it against the movable switch arm 326 to open the contact 327, thereby deenergizing the relay 304. What happens when the relay 304 is released will be explained when I describe the transmission operation from Fig. 4 to Fig. 2. It should be noted that the switch 326—327 is operated only when there is paper in the platen and the opening of this switch takes place after the message sheet 355 has been cut off. When there is no paper in the path of the knife, the switch 326—327 remains closed and the relay 304 stays energized.

*Transmission from main office to out-station (from Fig. 4 to Fig. 2)*

Let us suppose that a telegram is to be transmitted from the main office of Fig. 4 to the out-station receiver of Fig. 2. After wrapping the message on the drum 215, the operator places the drum into the machine, then inserts the transmitter plug 236 into the subscriber's jack 97 (Fig. 3). The closing of switch 229, when the drum is properly mounted in the machine, shorts out the normally energized relay 243 which releases the other normally energized relay 239. This releases the half-nut magnet 220 and energizes the drum motor 224, the chopper motor 218', the exciter lamp 217 and the power input lines 250 of the regulator-inverter 234. Although the motor 224 is running, the drum 215 is not turning and the scanning carriage 216 is not moving down because the clutch magnet 227 is not yet energized.

The insertion of plug 236 into jack 97 causes positive battery (for example, 110 volts) from terminal 105 to appear on the transmission lines L1—L2 through the plug and jack terminals. At the recorder in Fig. 2, this positive potential is open at the contact 303 of relay 304. Therefore, the full voltage appears at the plug terminals 237—238 and is impressed through the resistor network 260' on the starting anode 252 of the cold cathode tube 251. This tube thereupon operates and completes the circuit of relay 260 from plus battery terminal 261. The closed contact 264 causes negative current to flow from the negative battery terminal 265 through closed contact 266 of the released relay 243, closed contact 267 of the unenergized relay 268, through the relay 270 to the center tap of transformer 255, and through the connected plug and jack terminals over the lines L1—L2.

At the receiver in Fig. 2, the negative potential goes from the center tap of transformer 294 through the negative rectifier 301 and through the line relay 305 to ground at relay contact 308. The closed contact 310 of relay 305 places ground on the stylus belt 285 and the other contact 311 operates the power relay 314, which connects power to the amplifier RP from the main lines C—D. As soon as the tube 296 of the amplifier has heated up, the relay 332 is energized and its closed contact 334 completes the circuit of the stylus belt motor 287, the paper feed motor 288 and the fan motor 289.

Still referring to Fig. 2, the closed contact 335 of energized relay 332 completes the circuit of relay 309 from battery terminal 298 through a delay network 337, so that the relay 309 is not energized until the motor 287 has attained synchronous speed. The opened contact 308 and the closed contact 338 of energized relay 309 shunt out the line relay 305, which thereupon releases and in its place is inserted the capacitor-resistor network 306 in series with the phasing commutator 291. The line relay 305 stays deenergized for the remainder of the operation, its sole purpose being to energize the power relay 314. At this moment, the stylus belt 285 is rotating at synchronous speed and the paper is being fed slowly past the belt, so that the machine is in recording condition waiting for the facsimile signals from the main office transmitter.

Going back to the main office (Fig. 4), at the time the relay 270 was energized, its closed contact 271 caused the relay 272 to be energized from the plus battery terminal 273. The closed contact 276 of relay 272 operated the lamp 277 as a signal that connection had been made with the recorder. The closed contact 279 of relay 270 placed a grounded shunt around the phasing relay 280 and the opened contact 275 of relay 272 removed a previous ground from relay 280. Since the negative simplex circuit of relay 270 now goes through the rotating commutator 291 in Fig. 2, the next break in the circuit of relay 270 will momentarily release this relay and its opened contact 279 removes the shorting ground from relay 280, which now operates from the plus battery terminal 281 through the closed back contact 283 of deenergized relay 243. Once the relay 280 has operated, its opened contact 284 removes all grounds shunting its coil and it stays locked. The closed contact 364 shorts out the pulsing contact 271 of relay 270.

The operation of the phasing relay 280 completes the circuit of clutch magnet 227 from the battery terminal 365 through the closed relay contact 366 and through the closed grounded contact 367 of the inert relay 268. The energizing of magnet 227 releases the clutch cam 225, whereby the scanning carriage 216 is set in motion and the transmitter drum 215 starts to rotate in phase with the recording styluses 286 in the out-station receiver.

The message is now being scanned and the resultant facsimile signals are sent over the lines L1—L2 into the input transformer 294 of the recorder amplifier RP, whence the amplified signal output goes by wire 312 to the styluses 286. The signals are electrically recorded on special paper in a well-known manner that requires no description.

It may be noted that during the transmission cycle the following relays remain in operated condition: At the main office transmitter (Fig. 4), the relays 260, 270, 272 and 280; at the out-station recorder (Fig. 2) the relays 304, 309, 314 and 332. It will be understood from what has been said that the out-station recorder, once it has been started at the main office by the application of negative battery, will complete its cycle of recording the message, feeding out the proper length of paper and cutting off the blank, even if its connection with the main office is broken. Of course, when no facsimile signals come from the main office, the styluses will not record but the machine will keep on operating until the final paper feeding and cutting functions are performed.

When the scanning carriage 216 in Fig. 4 has concluded its prescribed length of downward travel, sufficient to cover the entire message area, it automatically closes a switch 368 which causes the relay 268 to be energized from battery terminal 261 through the closed contact 369 of deenergized relay 243. The relay 268 locks through its closed contact 370. The opened contact 367 of relay 268 breaks the circuit of clutch magnet 227 and locks the cam 225, so that the drum 215 and screw shaft 221 stop rotating. The opened contact 267 of relay 268 removes the negative battery from relay 270 and lines L1—L2 and replaces it with positive battery from terminal 371 through a high resistor 371′, make contact 372 of relay 272 and make contact 373 of relay 268 (both of these relays being energized). This positive simplex circuit is completed through the relay 270 because it is grounded by contact 303 of the energized relay 304 at the recorder in Fig. 2.

It is important to note that although this positive simplex circuit goes through the relay 302 in Fig. 2, this relay remains unenergized because the high resistor 371′ in the circuit cuts the current down to a low value insufficient to operate the relay 302.

When the end-of-message switch 368 is operated at the main office transmitter and stops the machine, the power relay 314 at the recorder in Fig. 2 remains energized and the motors 287 and 288 continue to operate, driving the stylus belt and feeding the paper. Since the signals have stopped coming over from the main office, the styluses 286 will not record anything but the paper continues to feed until a measured length (for example, 4⅝ inches) has been metered, whereupon the pin 342 on disk 341 moves the switch contact 340 against the contact 343.

The opening of switch contact 340 deenergizes the relay 314 and removes power from the amplifier RP. The closing of switch contact 343 energizes the knife motor 344 which operates the knife 354 to cut off the measured length of paper on which the message has been recorded. After the message sheet has been cut off, the pin 358 operates the switch arm 350 to break the circuit of motor 344 and to energize the buzzer 360 and the "Message received" lamp 361. These signals inform the attendant that the message has been received and is in the message compartment for removal. When the door of this compartment is opened to take out the message, a switch 374 automatically opens to deenergize the relay 359, which opens its contact 362 and turns off the signals 360 and 361.

When the knife 354 of the recorder cuts the paper and opens the switch contacts 326—327, the relay 304 is deenergized and its opened contact 303 removes ground from the positive battery circuit which energized the relay 270 in Fig. 4 at the close of the scanning operation. The relay 270 is thereby released and its opened contact 271 breaks the circuit of relay 272. With relay 272 released and relay 268 still energized, a lamp 375 is placed in circuit from battery terminal 376 through the closed back contact 377 of relay 272 and the front contact 378 of relay 268, which is still energized.

The lamp 375 is an acknowledgment signal telling the operator at the main office that the telegram has been received at the out-station and that connection with the recorder has been broken. Simultaneously with the appearance of lamp 375, the transmission lamp 277 goes out. The operator now pulls out the plug 236 and removes the drum from the transmitter, thereby extinguishing the final lamp 375 and restoring the relays to their normal condition. The re-energizing of magnet 220 releases the scanning carriage 216 for return to normal position and the machine is ready for the next transmission.

*Safety provisions of the system*

In a two-way facsimile system of this kind, it is advisable to provide for the correction of errors in the manual operation of switches at either end of the system. One of those correction devices is the release button 180 at the main office recorder (Fig. 3) for disconnecting an out-station transmitter that was started falsely, as already described in detail.

Another safety provision lies in the circuit that prevents the operation of the cold cathode tube 251 at the main office transmitter (Fig. 4) when a transmitter plug is inserted by mistake into a calling jack. Suppose a patron intending to send a message operates the start button 60 in Fig. 1. If the line is not busy, the patron's call lamp 106 will appear over his jack 97 at the main office (Fig. 3) and the positive standby potential kept on the line from battery terminal 105 will be grounded at contact 76 of the patron's energized relay 10. Now, if it should happen that the operator, in answering that call, inserts the transmitter plug 236 by mistake instead of the recorder plug 121, the cold cathode tube 251 will not receive a sufficiently high voltage on the starting anode 252, so that the tube will not fire. This prevents a connection being made with the main office transmitter, and the operator, thus informed of her mistake, will unplug the transmitter and insert the recorder plug 121.

As we have seen, the recorder circuits in Fig. 2 are such that the machine, once started by battery placed on the line at the main office, will complete its cycle of operation. It may happen that the operator at the main office will inadvertently plug into the wrong jack and immediately realizing her mistake will want to disconnect from the recorder. Merely withdrawing the plug will have no effect on the recorder, which will continue to operate, although it will do no recording. To shut down the out-station recorder under such conditions, the supervisor at the main office will press the release button 258 which connects the switch arm 257 to positive battery at terminal 379 through a low resistor 380. A positive current of high value is thus sent over the line through the rectifier 300 in Fig. 2 and through the winding of relay 302 to ground at contact 303 of the energized relay 304. This current is sufficient to energize the relay 302 which opens its contact 315 and disconnects all power from the machine. The wrongly inserted transmitter plug in the main office can now be withdrawn.

Although I have shown but one recorder and one transmitter at the main office, in the practical use of my two-way facsimile system the main office is equipped with as many transmitters and recorders as are needed to serve the required number of out-stations. Figs. 1 and 2 together represent one out-station and constitute one terminal of a send-receive system connected with the main office. When a call is received at the main office, the operator plugs in any available recorder. Likewise, when a telegram arriving at the main office is to be sent to an out-station, the message bearing drum 215 is inserted in any transmitter that happens to be free.

While this system is independent of any particular construction of transmitter and recorder at either terminal, it is necessary to use machines capable of being controlled by the various circuits set forth. So it will be understood that the machines on which the circuits in the drawings are based and which were previously identified by reference to the Wise and Ridings Patent No. 2,262,715 and to certain pending applications, are to be regarded as illustrative and not restrictive of my invention as defined in the appended claims.

I claim as my invention:

1. In a two-way facsimile communication system between a main telegraph office and an out-station, a transmitter and a recorder at the main office, a transmitter and a recorder at the out-station, a single pair of wires between the main office and the out-station for operatively connecting either transmitter with the distant recorder, the out-station transmitter having a normally closed chute for the deposit of messages, a start switch for the out-station transmitter, means controlled by the operation of said start switch for opening said chute, and means including a relay controlled by the out-station recorder and operative to prevent the opening of said chute when the out-station recorder is in communication with the main office transmitter.

2. In a two-way facsimile telegraph system, a transmitter and a recorder at an out-station adapted each to be operatively connected with a main telegraph office for respectively sending and receiving messages over a single pair of wires, a start switch for said out-station transmitter, a relay at one of said out-station machines, an electronic device in the circuit of said relay, an amplifier for each of said out-station machines, circuit connections whereby said line wires are connected to one of said amplifiers when said relay is unenergized and connected to the other amplifier when said relay is energized, and means including a voltage divider for energizing said electronic device after a predetermined delay upon the closing of said start switch to complete the circuit of said relay, and means controlled by the other out-station machine and operative to prevent the completion of the circuit of said relay when said other out-station machine is operatively connected with the main office.

3. In a facsimile telegraph system for sending messages from an out-station to a main office over a wire line, a transmitter at the out-station and a recorder at the main office, said transmitter having a rotary message-holding drum and a movable scanning carriage, motor means for operating said drum and carriage, means at the main office for selectively supplying either positive current or negative current to said line at different predetermined times, apparatus at the transmitter for causing the current of one polarity to start the operation of said drum, and other apparatus at the transmitter for causing the current of opposite polarity to start the operation of said scanning carriage.

4. In a facsimile telegraph system for sending messages from an out-station transmitter to a main office recorder over a pair of wires, a transformer at each machine placed across said wires and having a center tap, control circuits at the main office connected to the center tap of the associated transformer for selectively supplying either positive current or negative current to said wires, a pair of rectifiers at the transmitter connected to the center tap of the associated transformer and poled in such a way that said positive current flows through one rectifier and said negative current through the other rectifier, a relay connected to the positively poled rectifier and a second relay connected to the negatively poled rectifier, scanning mechanism at the transmitter, and means requiring the energizing of both relays to start the operation of said mechanism.

5. In a facsimile telegraph system, an out-station transmitter and a main office recorder adapted to be connected over a wire line, a relay at the transmitter adapted when energized to connect the transmitter to a local source of power, means at the main office for sending battery current of prescribed low value over the line, means at the transmitter energized by said low battery current to connect said relay to its source of power and thereby energize the transmitter, other means at the main office for sending battery current of prescribed high value over the line, and other means at the transmitter energized by said high battery current to release said relay and thereby disconnect the transmitter from its source of power.

6. In a facsimile telegraph system, an out-station transmitter and a main office recorder adapted to be connected over a wire line, a first relay at the transmitter adapted when energized to connect the transmitter to a local source of power, means at the main office for sending battery current of prescribed low value over the line, a second relay at the transmitter adapted to be energized by said low value current to cause the energizing of said first relay, other means at the main office for sending battery current of prescribed high value over the line, a third relay at the transmitter adapted to be energized by said high battery current, and circuit connections controlled by the operations of said third relay for releasiny the first relay to disconnect the transmitter from its source of power.

7. In a facsimile telegraph system, an out-station transmitter and a main office recorder adapted to be connected over a wire line, means at the main office for keeping battery potential on the line during a transmission cycle, a switch at the transmitter for holding the battery circuit closed during the scanning of a message, a relay at the main office energized by said battery potential, means at the transmitter for momentarily opening said switch at the close of a scanning cycle and thereby releasing said relay at the main office, a relay at the transmitter energized by said battery current to delay the opening of said switch sufficiently long to prevent the re-energizing of said main office relay when said switch closes to restore the battery potential on the line, and apparatus at the main office responsive to the release of said last relay to stop the recording mechanism of the recorder.

8. In a facsimile telegraph system for sending messages from an out-station to the main office over a wire line, a transmitter at the out-station and a recorder at the main office, said transmitter having a rotary message-holding drum and a movable scanning carriage, motor means for operating said drum and carriage, means at the main office for impressing battery potential of one polarity on said line, means at said transmitter for causing said battery potential to start the operation of said drum, means controlled by a message sheet on the rotating drum for sending phasing signals over the line, a relay at the recorder adapted to be energized in response to said signals, means controlled by said relay for causing battery potential of opposite polarity to be impressed on said line, and means at the transmitter controlled by said opposite potential to start the operation of said scanning carriage.

9. In a facsimile telegraph system for sending messages from an out-station to a main office over a wire line, a transmitter at the out-station and a recorder at the main office, said transmitter having a rotary message-holding drum and a movable scanning carriage, motor means for operating said drum and carriage, said recorder having recording mechanism and motor means for operating same, means at the main office for impressing battery potential of one polarity on said line, means at the transmitter for causing said battery potential to start the operation of said drum, means controlled by a message sheet on the rotating drum for sending phasing signals over the line, a relay at the recorder adapted to be energized in response to said phasing signals, a magnetic device at the recorder energized in response to the energizing of said relay to start the operation of said recording mechanism, switch means controlled by said energized device for causing battery potential of opposite polarity to be impressed on the line, and means at the transmitter controlled by said opposite potential to start the operation of said scanning carriage.

10. In a facsimile telegraph system, an out-station transmitter and a main office recorder adapted to be connected over a pair of wires, a coil connected across said wires at each terminal of the system, a first pair of relays at the transmitter connected in series, a second pair of relays at the transmitter also connected in series, one relay of each pair operating on a low current and the other relay operating on a high current, a positively poled rectifier connected to the first pair of relays and a negatively poled rectifier connected to the second pair of relays, said rectifiers being connected in series and a middle point of the rectifiers being connected to a center tap on said coil, means at the main office for sending a positive current of low value through the first pair of relays to connect the transmitter to a source of power, circuit connections at the main office for sending negative current of low value through the second pair of relays to start the transmitter scanning mechanism, means at the main office for sending a positive current of high value through the first pair of relays to disconnect the transmitter from its source of power at the close of a transmission cycle, and other means at the main office for sending a negative current of high value through the second pair of relays to disconnect the transmitter from its source of power when its scanning mechanism remains inoperative after the power is turned on.

11. In a facsimile telegraph system, an out-station transmitter and a main office recorder adapted to be operatively connected over a wire line, said transmitter having a rotary drum on which a message is mounted for scanning, a start switch at the transmitter, a signal device at the main office automatically energized when said start switch is operated, a relay at said transmitter adapted when energized to connect the transmitter to a local source of power, means for energizing said relay when the start switch is operated, means at the main office including a start button for connecting said recorder to the calling transmitter in response to said energized signal device, means whereby the presence of a message on said transmitter drum after the operation of the start button causes the main office recorder to operate, so that the failure of said recorder to operate after the closing of said start switch indicates to the main office attendant the absence of a message on the drum of the energized out-station transmitter, a second relay at the transmitter adapted to be energized only by battery current of predetermined high value, manually controlled means at the main office for sending such high battery current over the wire line through said second relay, and circuit connections controlled by said second relay for releasing said first relay and turning off the power at the falsely started transmitter.

12. In a facsimile telegraph system, a main office transmitter and an out-station recorder adapted to be connected over a wire line which terminates in a jack at the main office, said transmitter having a plug for insertion into said jack, means whereby the connection of said plug to said jack automatically energizes the recorder and places it in condition for recording, and means whereby the operative condition of the recorder automatically starts the scanning operation of the transmitter.

13. In a facsimile telegraph system, a main office transmitter and an out-station recorder adapted to be connected over a wire line, means at the main office for sending negative battery current over said line, a relay at the recorder adapted to be energized by said negative battery current for connecting the recorder to a source of power, means at the main office for sending positive battery current over the line, and a second relay at the recorder adapted to be energized by said positive battery current for disconnecting the recorder from its source of power.

14. In a facsimile telegraph system, a main office transmitter and an out-station recorder adapted to be connected over a wire line, switch means at the main office for sending battery current of one polarity over the line, apparatus at the recorder for causing said battery current to start the recorder, other switch means at the main office selectively operable for sending battery current of opposite polarity over the line, and means at the recorder responsive to said last current for stopping the recorder.

15. In a facsimile telegraph system, a main office transmitter and an out-station recorder adapted to be connected over a wire line, means at the transmitter for sending battery current over the line, a relay at the recorder energized by said battery current, means responsive to the operation of said relay for energizing the recorder and placing it in condition for recording facsimile signals, a relay at the transmitter, means responsive to the operative condition of the recorder for utilizing said battery current to energize said last relay, and means responsive to the operation of said last relay to start the transmission of facsimile signals to the energized recorder.

16. In a facsimile telegraph system, a main office transmitter and an out-station recorder adapted to be connected over a wire line, said recorder having recording mechanism which utilizes a continuous sheet fed from a supply roll, means at the transmitter for placing the same in communication with the recorder, a cutting device at the recorder automatically operated at the close of a recording cycle to cut off the recorded sheet, a signal device at the main office transmitter, and means controlled by the operation of said cutting device for energizing said signal device as an acknowledgment of the receipt of the transmitted message.

17. In a facsimile telegraph system, a transmitter and a recorder adapted to be connected over a wire line, said transmitter having scanning mechanism and said recorder having recording mechanism, each of said mechanisms including a rotary member, means at the transmitter for sending steady battery current over the line, means at the recorder controlled by said battery current for energizing the recording mechanism, means whereby the operation of said recording mechanism converts said steady battery current to battery current pulses in unison with the speed of said rotary recording member, and apparatus at the transmitter operable in response to said battery current pulses for starting the rotary member of said scanning mechanism.

18. In a facsimile telegraph system, a main office transmitter and an out-station recorder adapted to be connected over a wire line which terminates in a jack at the main office, said transmitter having a plug for insertion into said jack, an electronic device at the transmitter automatically energized when the plug is connected to the jack, means controlled by said energized device for supplying steady battery current to the line, apparatus at the recorder responsive to said steady battery current for placing the recorder in operative condition, said apparatus including means for interrupting said battery current by the operation of the recorder, and mechanism at the transmitter responsive to said battery current pulses for starting the scanning mechanism of the transmitter.

19. In a facsimile telegraph system, a main office transmitter and an out-station recorder adapted to be connected over a wire line which terminates in a jack at the main office, scanning mechanism for said transmitter, recording mechanism for said recorder, manually controlled means for energizing said scanning mechanism, a plug at said transmitter for insertion into said jack, means at the transmitter automatically operated in response to said plug-and-jack connection to send battery potential over the line, means at the recorder automatically operated in response to said battery potential to energize said recording mechanism, and apparatus at the transmitter responsive to the energized condition of said recording mechanism to operate said scanning mechanism.

20. In a facsimile telegraph system, a transmitter and a recorder at a main office, each of said machines having a plug, an out-station terminal having a transmitter and a recorder for respectively sending messages to said main office recorder and receiving messages from said main office transmitter, a wire line over which the main office machines and the out-station machines are placed in communication with each other, said wire line terminating at the main office in a jack adapted to receive the plug of either main office machine, a calling signal device associated with said jack, a start switch for the out-station transmitter, means whereby the operation of said start switch energizes said signal device, apparatus responsive to the insertion of the main office recorder plug into said jack for automatically starting the operation of the main office recorder, and means at the main office transmitter for preventing operation thereof when the transmitter plug is inserted into the jack in false response to the energized calling signal device, said last means including an electronic device adapted to be energized only when the transmitter plug is inserted into the jack for connecting the main office transmitter with the out-station recorder.

21. In a facsimile telegraph system, a main office transmitter provided with scanning mechanism which includes a rotary message-bearing drum removably supported in the machine and a slidable scanning carriage associated with said drum, a motor for operating said drum and carriage, a normally energized relay, means whereby said energized relay holds the motor circuit open before a drum is inserted, means responsive to the presence of a drum in the transmitter for deenergizing said relay and closing the motor circuit, means for holding the energized motor disconnected from said drum and carriage, in combination with an out-station recorder adapted to be connected with said transmitter over a wire line which terminates in a jack at the main office, said recorder having recording mechanism which includes a rotary member, a plug connected to said transmitter and adapted to be inserted into said jack, means at the transmitter responsive to said plug-and-jack connection for supplying steady battery current to the line, apparatus at the recorder responsive to said steady battery current for energizing the recording mechanism, means whereby the operation of said rotary member automatically changes said steady line battery current to pulsing battery current, and means at the transmitter responsive to said battery pulses for operatively connecting the transmitter scanning mechanism to said motor.

References Cited in the file of this patent

UNITED STATES PATENTS

| | | |
|---|---|---|
| 2,262,715 | Wise et al. | Nov. 11, 1941 |
| 2,315,361 | Wise et al. | Mar. 30, 1943 |
| 2,342,693 | Ressler | Feb. 29, 1944 |
| 2,374,704 | Ridings et al. | May 1, 1945 |
| 2,392,442 | Wise et al. | Jan. 8, 1946 |
| 2,450,030 | Wise | Sept. 28, 1948 |
| 2,522,919 | Artzt | Sept. 19, 1950 |